Sept. 26, 1933.  O. BALLY  1,928,523
MOTOR CAR WITH SLIDING DOORS
Filed Aug. 19, 1931   2 Sheets-Sheet 1

O. Bally
INVENTOR
By: Marks & Clerk
attys.

Sept. 26, 1933.     O. BALLY     1,928,523
MOTOR CAR WITH SLIDING DOORS
Filed Aug. 19, 1931     2 Sheets-Sheet 2
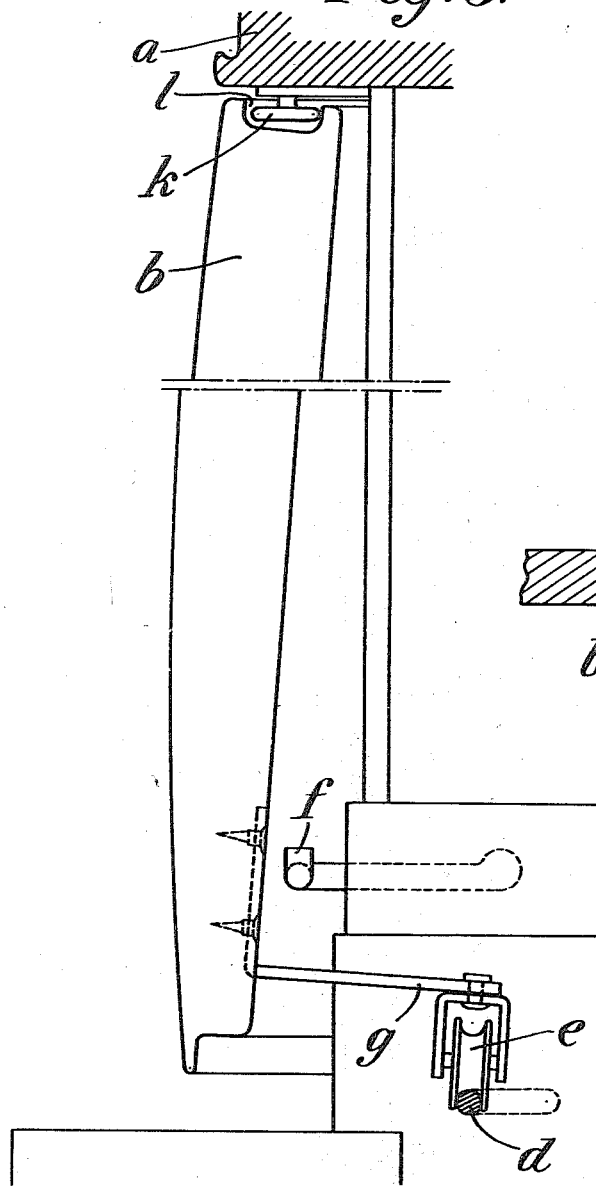
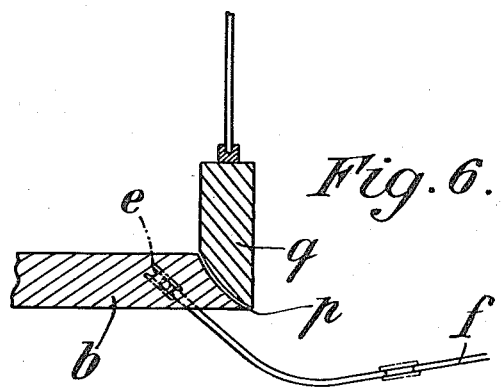
O. Bally
INVENTOR
By: Marks + Clerk
Attys.

Patented Sept. 26, 1933

1,928,523

UNITED STATES PATENT OFFICE 1,928,523

MOTOR-CAR WITH SLIDING DOORS

Oscar Bally, Kusnacht, near Zurich, Switzerland

Application August 19, 1931, Serial No. 558,181, and in Switzerland May 15, 1931

7 Claims. (Cl. 296—47)

This invention relates to a motor-car with a sliding door which when being opened can be slid for instance forwards between the bonnet and the mudguard.

According to the invention the sliding door is supported at the bottom at two points, one of which is guided along a forward rail and the other along a rearward rail or the like. In addition the door is guided at the top at a fixed point in the vicinity of the forward corner of the body. The rearward guiding rail is formed at least at its rear end in such a manner that the sliding door immediately on commencing its opening movement has an outward motion imparted to it.

Figure 1:
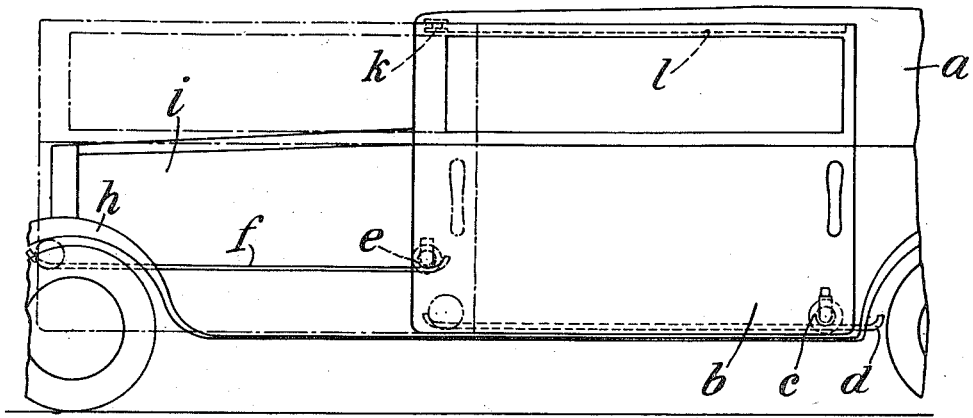
Figure 2:
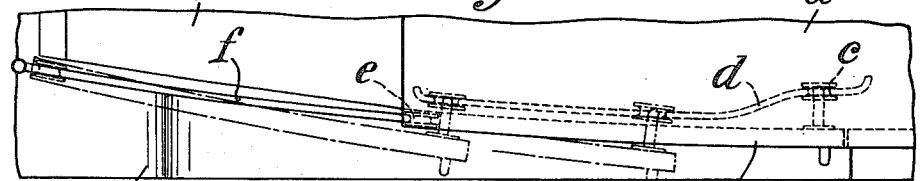
Figure 4:
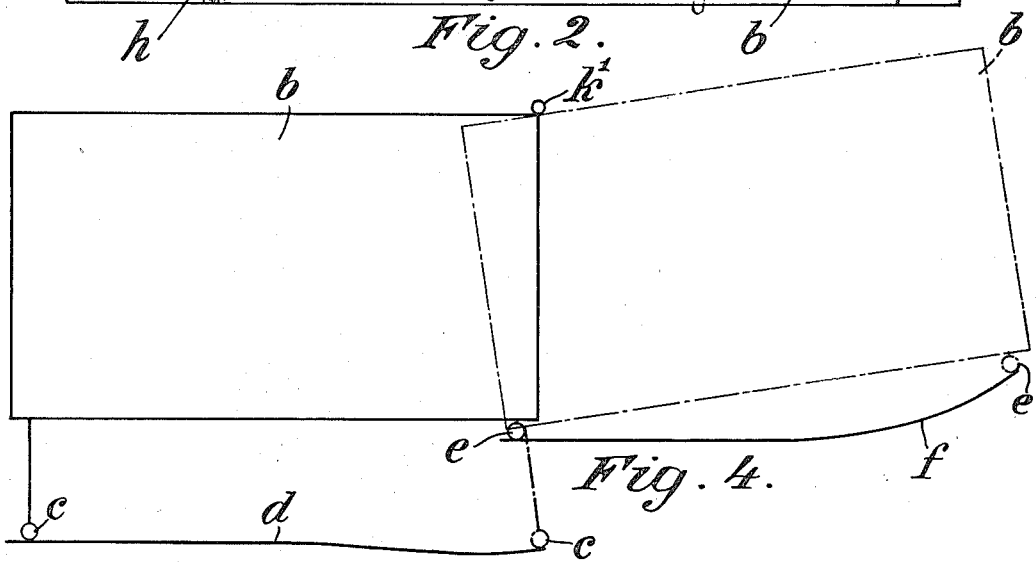
Figure 5:
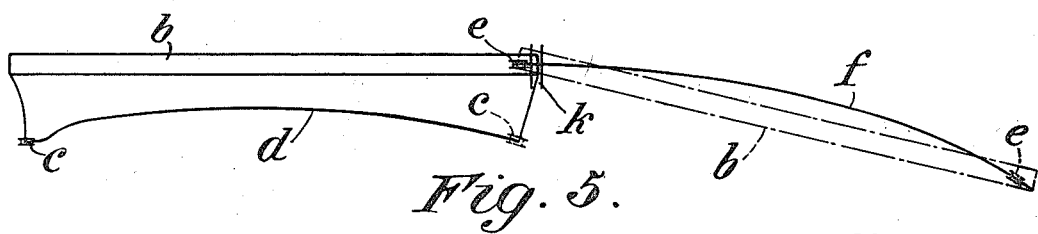

In the accompanying drawings a constructional example of the invention is shown in Fig. 1 in side elevation and in Fig. 2 in part plan view. Fig. 3 shows the opened door from the rear. Figs. 4 and 5 are a diagrammatic elevation and plan view of a second constructional form with the door in two positions. Fig. 6 is a horizontal section through a portion of a third constructional form.

In the drawings $a$ is the body of the car, $b$ the door of the vehicle. The door is supported by means of a rearward roller $c$ on a rail $d$ and by means of a forward roller $e$ on a rail $f$. The roller $c$ is supported by an inwardly directed arm $g$ fixed to the door and is capable of turning both about a horizontal and about a vertical axis. The rearward end of the guiding rail $d$ is cranked inwards in such a manner that on the door being pushed forward the rear end of the same immediately has an outward movement imparted to it, the door adopting an inclined position (Fig. 3). This prevents the door rubbing against the body of the car. The rail $d$ is mounted approximately at the height of the step and the rail $f$ at the height of the chassis. The rail $f$ extends between the mudguard $h$ and the bonnet $i$. The roller $e$ is journalled in such a manner that it can set itself in all directions.

At the forward top corner of the body $a$, that is in the neighbourhood of the forward body upright, a roller $k$ is journalled on a vertical pin, which roller engages in a groove $l$ extending along the upper edge of the door and thus acts as a guide for the door when moving and also forms a fulcrum for the door when moving in the direction at right angles to the body.

According to the amount of space between the bonnet and the mudguard it may be necessary slightly to raise the door at the end of its forward movement. In this case the door must at the same time be dropped slightly at the back. For this purpose the rearward guiding rail is bent slightly downwards at the forward end and the forward rail bent slightly upwards at the forward end. The bends in the rails should be made such that the rotary motion of the door takes place in a vertical plane about a horizontal axis which intersects the vertical axis of rotation of the upper guiding roller $k$ journalled on the car body. An example of such a constructional form is shown diagrammatically in Figs. 4 and 5 in elevation and plan view, the broken lines showing the door $b$ in the pushed forward position. $k^1$ indicates the point lying vertically below the axis of rotation $k$, about which the door $b$ turns in its forward motion, owing to the forward ends of the guide rails $d$ and $f$ being bent downwards and upwards respectively.

Should the door not be mounted laterally of the body, as shown in the drawings, but flush with it like an ordinary door, it is necessary before the sliding motion to move the whole door out of the car body in a transverse direction to the same. This transverse motion may take place simultaneously at both ends of the door or first at one end and then at the other end of the door.

As indicated in Fig. 6, the forward guide rail $f$ supporting the roller $e$ is in such a case also bent outwards at its rear end. The roller $e$ is rotatable about both a vertical and a horizontal axis and the joint $p$ between the forward body upright $q$ and the door $b$ extends in cross-section preferably along the arc of a circle at an angle of 45° to the longitudinal axis of the car. The upper fixed point about which the door turns when being opened is in the case at the end of an arm which can be swung outwards, so that on the door being opened, the upper edge of the door is guided outwards with a circular motion.

The invention is capable of wide variation within equivalent limits and I contemplate such variation as may be desirable or useful in the particular adaptation of the invention shown or in its adaptation to other forms of car bodies. For instance the displacing of the door into the room between the mudguard and the bonnet is made with regard to the modern standard form of the motor cars. The invention is also applicable on other structures of motor cars, whereat also a rearward movement of the door, when being opened, can be taken into consideration.

What I claim is:

1. A motor-car comprising a body, a sliding door, two supporting members at the bottom of the door for carrying the weight thereof and movable therewith, a supporting guide for each of said supporting members, an upper guide at the top of the door, a member carried by the body engaging the upper guide and forming a stationary fulcrum point for the door permitting the latter to turn about more than one axis, at least one of said supporting guides being disposed to cause the door, during opening movement, to turn about the stationary fulcrum point in at least two directions and move away from the body.

2. A motor-car comprising a car body, a sliding door, supporting rollers carried by the front and rear portions of the bottom of the door, a supporting and guiding rail for each of said rollers, a guide extending along the upper part of the door, a roller carried by the body and loosely engaging the upper guide and adapted to turn about a fixed vertical axis on the car body to accommodate oscillation of the door during sliding movement thereof.

3. A motor-car as claimed in claim 2, characterized in that the supporting and guiding rail engaged by the roller carried by the rear lower portion of the door is shaped to effect outward swinging movement of the door away from the car body at the commencement of its sliding motion, said door, during its sliding movement, turning about the stationary vertical axis of the roller engaging the upper guide and at the same time about a movable horizontal axis intersecting said vertical axis and extending parallel with said upper guide.

4. A motor-car as claimed in claim 1, characterized in that the supporting guides are arranged to cause the door to turn about a horizontal axis disposed perpendicular to the direction of its sliding movement during opening of said door.

5. A motor-car as claimed in claim 1, characterized in that the supporting guides are arranged to cause the door, during its opening movement, to turn about two horizontal axes, one disposed substantially parallel and the other substantially perpendicular to the direction of sliding movement of the door.

6. A motor-car as claimed in claim 2, characterized in that the supporting and guiding rails engaging the two lower rollers of the door are disposed to cause the door, during commencement of sliding movement thereof, to swing laterally and clear the doorway of the car-body.

7. A motor car comprising a body, a sliding door thereon, two supporting rollers mounted in a suitable distance one behind another on the lower part of the door to carry the weight thereof, a supporting rail for each of these rollers, the rear one of these rails being mounted along said body, the forward one extending between the mudguard and the bonnet of the motor car, a guide-track formed along the upper edge of said door and a stationary guiding member mounted on the front upper corner of said body and engaging with said guide track in such a manner as to allow the door on its sliding movement to oscillate about at least two axes intersecting one another in said guiding member whilst the weight of the door is constantly carried by said supporting rollers.

OSCAR BALLY.